US009751791B2

(12) United States Patent
Gonzalez Calvo

(10) Patent No.: US 9,751,791 B2
(45) Date of Patent: Sep. 5, 2017

(54) METHOD AND FACILITY FOR THERMAL HYDROLYSIS OF ORGANIC MATTER HAVING SHORT RESIDENCE TIMES AND NO PUMPS

(71) Applicant: TE Consulting House 4 Plus, SL, Valladolid (ES)

(72) Inventor: Rafael Gonzalez Calvo, Valladolid (ES)

(73) Assignee: TE Consulting House 4 Plus, SL, Valladolid (ES)

( * ) Notice: Subject to any disclaimer, the term of this patent is extended or adjusted under 35 U.S.C. 154(b) by 0 days.

(21) Appl. No.: 15/317,141

(22) PCT Filed: May 20, 2015

(86) PCT No.: PCT/ES2015/070396
§ 371 (c)(1),
(2) Date: Dec. 8, 2016

(87) PCT Pub. No.: WO2015/189449
PCT Pub. Date: Dec. 17, 2015

(65) Prior Publication Data
US 2017/0203988 A1 Jul. 20, 2017

(30) Foreign Application Priority Data

Jun. 11, 2014 (ES) .................. 201430895

(51) Int. Cl.
C02F 1/02 (2006.01)
C02F 11/18 (2006.01)

(52) U.S. Cl.
CPC .............. *C02F 11/18* (2013.01); *C02F 1/025* (2013.01); *C02F 2301/066* (2013.01); *C02F 2303/06* (2013.01)

(58) Field of Classification Search
CPC .. C02F 1/02; C02F 1/025; C02F 11/06; C02F 11/08; C02F 11/086; C02F 11/10;
(Continued)

(56) References Cited

U.S. PATENT DOCUMENTS 5,888,307 A 3/1999 Solheim
2012/0111515 A1* 5/2012 Nilsen ............... C02F 1/025
162/68

FOREIGN PATENT DOCUMENTS

WO 2013163998 A1 11/2013
WO 2013167469 A1 11/2013

OTHER PUBLICATIONS

Written Opinion of the International Preliminary Examination Authority, PCT/ES2016/070396, ES/ISA, dated Jun. 3, 2015.

* cited by examiner

*Primary Examiner* — Lucas Stelling
(74) *Attorney, Agent, or Firm* — Nancy J. Flint, Esq.; Nancy J. Flint, Attorney At Law, P.A.

(57) ABSTRACT

The invention relates to a continuously operational method for thermal hydrolysis of organic matter, which includes an impelling step in which the organic matter is conveyed, without the need to use pumps or other mechanical elements, a hydrolysis step in which the mass to be hydrolyzed is heated using live steam until reaching high temperatures in very short times and, after undergoing a first breakdown of the structure, is maintained at the hydrolysis temperature during a predetermined time, and an energy recovery step with vapors of two enthalpy levels. The invention also relates to a facility for implementing the method, which includes interconnected load and pressurization tanks in the impelling step, a quick mixer and a relief chamber in the
(Continued)

hydrolysis step, and a decompression system with a flash chamber and an ejector that mixes the produced vapors in the recovery step.

14 Claims, 2 Drawing Sheets

(58) Field of Classification Search
CPC .. C02F 11/18; C02F 11/185; C02F 2301/066;
C02F 2303/06
See application file for complete search history.

METHOD AND FACILITY FOR THERMAL HYDROLYSIS OF ORGANIC MATTER HAVING SHORT RESIDENCE TIMES AND NO PUMPS

TECHNICAL FIELD OF THE INVENTION

The invention can be applied to the treatment of organic material including sludge, sewage, domestic and industrial waste and any material susceptible to be methanized in anaerobic digestion processes. The invention corresponds to a system that operates with no mechanical elements in contact with the solid matter to be treated and is able to operate at high temperatures and with extremely short residence times, without the presence of secondary reactions and achieving an adequate energy integration.

BACKGROUND OF THE INVENTION

Based on the conventional scheme for the anaerobic digestion of solids, the hydrolysis (solubilization, liquefaction) stage limits the global kinetics of the process. Different physical, chemical and biological pre-treatment processes are applied to the anaerobic digestion to improve the kinetics of the hydrolysis stage and hence improve the kinetics of the global methanogenic process. The thermal hydrolysis process is based on keeping the solid at high temperatures and pressures during relatively long periods, normally longer than 30 minutes. After that, and taking advantage of the high pressure of the hot material, it can undergo a sudden decompression or flash process to achieve the so-called steam explosion effect that fractures the structure of the solids. Other processes utilize heat exchangers to recover energy from the hot material.

Different commercial thermal hydrolysis processes use batch operations. To achieve a nearly continuous process, they operate several reactors in temporized loading and unloading cycles. The well-established CAMBI commercial process operates under those conditions. Patent FR 2820735 includes the use of two batch reactors operating in parallel. Patent WO 2011/006854 A1 "Method and device for thermal hydrolysis and steam explosion of biomass" utilizes three reactors operating in sequential mode to achieve a close-to-continuous flow pattern.

Concerning continuous operation, the Portheous process is applied to digested sludge under anaerobic conditions using reactors with live steam injection, with the objective of improving dewaterability.

Several patents have proposed systems that operate continuously. U.S. Pat. No. 5,593,591 from 1997 claims a system wherein the pumped, pressurized sludge is heated up in the same pipe, before it is decompressed through a nozzle and enters a flash vessel. The objective is to produce a hydrolyzed sludge with good flow features (free flowing solids).

U.S. Pat. No. 5,785,852 from 1998 claims a process and equipment for the treatment of biological sludge to improve the secondary anaerobic digestion. The multi-stage process combines heating, flashing and shear forces application. A "hydrotreater" is the steam and sludge mixing system suggested as the most efficient. The hot, pressurized sludge enters a flash vessel that operates at atmospheric conditions. The partially disaggregated sludge enters a new stage where shear forces are applied to complete the cell structure fracture process.

European patent EP 1 198 424 B1 "A method and arrangement for continuous hydrolysis of organic material" discloses a system consisting of tanks, vessels or recipients wherein the pre-heating, reaction and decompression stages take place continuously. Heating steam injection is carried out in external mixing devices. The sludge residence time in the hydrolysis reactor is fixed between 5 and 60 minutes.

Spanish patent 2 341 064 "Reactor and energy integration system for continuous thermal or thermochemical hydrolysis of organic material" discloses a system that operates continuously and is energy-integrated within the biogas-based electric power generation system.

Patent US2011114570 "An apparatus and a method for continuous thermal hydrolysis of biological material" discloses a tubular reactor wherein the biological solid is heated up with steam injection and is subsequently cooled down with cooling water to avoid flashing during the decompression process.

Patent WO2008/115777 A1 "Treatment of particulate biodegradable organic waste by thermal hydrolysis using condensate recycle" uses an external feed preheater that receives the heating steam. The hot material flows through the tubular reactor and enters a flash vessel, the vapor from the flash chamber is condensed and recycled to the preheat tank.

European Patent application No 13382077.9 "Continuously operating method for the thermal hydrolysis of organic material and installation for implementing the method" is based on the use of internal recycle circuits.

In all the patents analyzed, the hydrolysis reaction is done using tanks, tubular reactors or internal recycle circuits. Those processes indicate that the thermal hydrolysis operation is carried out with long hydraulic residence times.

In all cases, the hot material to be hydrolyzed is compressed using different types of mechanical pumps. The maintenance of those pumps is very demanding, mainly due to the high viscosity and abrasive characteristics of the material to be pumped.

Definition of the Invention

As illustrated in the block diagram in FIG. 1, the procedure has the following stages: impulsion (1), hydrolysis (2), heat recovery (3).

In essence, this procedure is characterized in that the impulsion stage (1) comprises dosification vessels operating in batch and feeding the pressurization tanks to achieve a continuous and controllable flow of the material entering the hydrolysis stage. The hydrolysis stage (2) comprises the quick mixing of the material to be hydrolyzed with live steam (4) that, once decompressed, is kept at hydrolysis temperature. The heat recovery stage (3) is based on the generation of medium-pressure and low-pressure vapors that are recycled to the loading stage (5) to act as preheating fluids.

The impulsion stage comprises two dosification vessels wherein the material to be hydrolyzed is alternatively loaded and sequentially fed to the pressurization tanks. One of the pressurisation tanks is pressurised with air or steam to pressures comprised between 4-25 barg, so that the organic material is pushed through the pipework without the need for pumps or any other mechanical devices. While this tank is unloading, the other pressurisation tank receives the feed from the dosification vessel, and when the loading is complete, the vessel is pressurised, ready to be connected to the process line when the first pressurisation vessel reaches its minimum level, starting a new cycle.

The material already loaded in the dosification vessels receives the vapors flow from the heat recovery stage, reaching temperatures between 105 and 180° C.

With this combination of cycles in series, the process operates continuously. Furthermore, with the adequate pressurization of the vessels, for the use of special pumps is avoided, whose wearing and maintenance constitute the main source of problems in continuous processes that operate with high pressures and temperatures (Kopmann & Kopp (2010), "Full scale continuous thermal hydrolysis of waste activated sludge for the improvement of the sludge digestion and sludge dewatering in WWTP Geiselbulach Germany", European Biosolids and Organic Resources. Leeds; and Fdz-Polanco et al. (2010), "Squeezing the sludge. Thermal Hydrolysis to improve WWTP sustainability", IWA—13 World Congress on Anaerobic Digestion, Santiago de Compostela).

Therefore, the claimed technology is based on a simple and robust technology to continuously convey organic material from the initial ambient temperature and atmospheric pressure to the high pressures and temperatures required by the hydrolysis stage. The claimed system, unlike existing ones, does not need the use of any type of pumps, eliminating their high maintenance cost.

The pressurized, preheated organic material reaches the hydrolysis stage wherein the necessary amount of live steam is injected in a static mixer for the fluid to extremely quickly, in less than 5 seconds, reach the temperature set-point. Existing systems keep the material to be hydrolyzed at high temperatures long enough for reactions transforming organic material into non-biodegradable or even toxic material to occur, lowering the methanogenic potential of the organic material. For this reason, in practice the standard hydrolysis temperature does not exceed 180° C.

The claimed technology operates with heating times of just a few seconds, hence the extent of the secondary reactions is limited even if the 180° C. barrier is exceeded.

After heating up to up to 220° C. in very short times, the hot, pressurized fluid is flashed and enters a regulation and relief tank that allows achieving a stable pressure and an easy system control. Because of the pressure difference between the mixing stage and the relief tank, in the transition from one to the other there is a first flash and associated fracture of the organic material structure, which will then have a fixed residence time in the relief tank.

This operating philosophy is conceptually different to all the existing hydrolysis technologies and, in particular, to the ones combining heating and flashing. In the present invention, the heating time is extremely short, which enables temperatures exceeding the theoretical 180° C. limit. In addition, the organic material that has undergone a first fracture in the transit from the mixer to the relief tank is kept at hydrolysis temperature in the later during an optimum residence time. Existing technologies first hydrolyze with relatively long residence times and temperatures below the limit for unwanted secondary reactions and only then they flash, while in the present invention, the sequence is the opposite: the material is first flashed at higher temperatures than in existing processes and then, with the material already disaggregated, it undergoes reaction at hydrolysis temperature.

The fluid contained in the relief tank goes through a valve and expansion orifices system and enters the flash vessel, where it flashes. The flash vessel can operate between −0.5 and 4 barg. This flash breaks the structure of the organic material, helping the solubilization and the accessibility of the downstream anaerobic digestion (not included in the block diagram).

For good controllability of the flash stage, the technology of the system sketched in FIG. 2 is claimed. Depending on the design flowrate, an orifice is dimensioned so that at operating pressures the flow through it is between 60 and 90% of the total flowrate. The automatic valve controls the flowrate of the remaining flow, ensuring a finer, more stable regulation.

Finally, the medium-pressure steam generated in the relief vessel and the low-pressure steam produced in the flash vessel enter an ejector or thermocompressor from where their mixture is recycled to the feed system, wherein they are condensed preheating the feed; the hydrolyzed liquid continues to anaerobic digestion or to any other system. The medium-pressure steam line is connected to the high-pressure steam system so that, if required, high-pressure steam can be injected, thus reaching the impulsion system.

The claimed invention operates with three steam pressure levels, unlike existing technologies, providing great flexibility and allowing different solutions to achieve the optimum integration of the thermal hydrolysis process under different operating conditions.

EXPLANATION OF AN EMBODIMENT OF THE INVENTION

Figure 3:
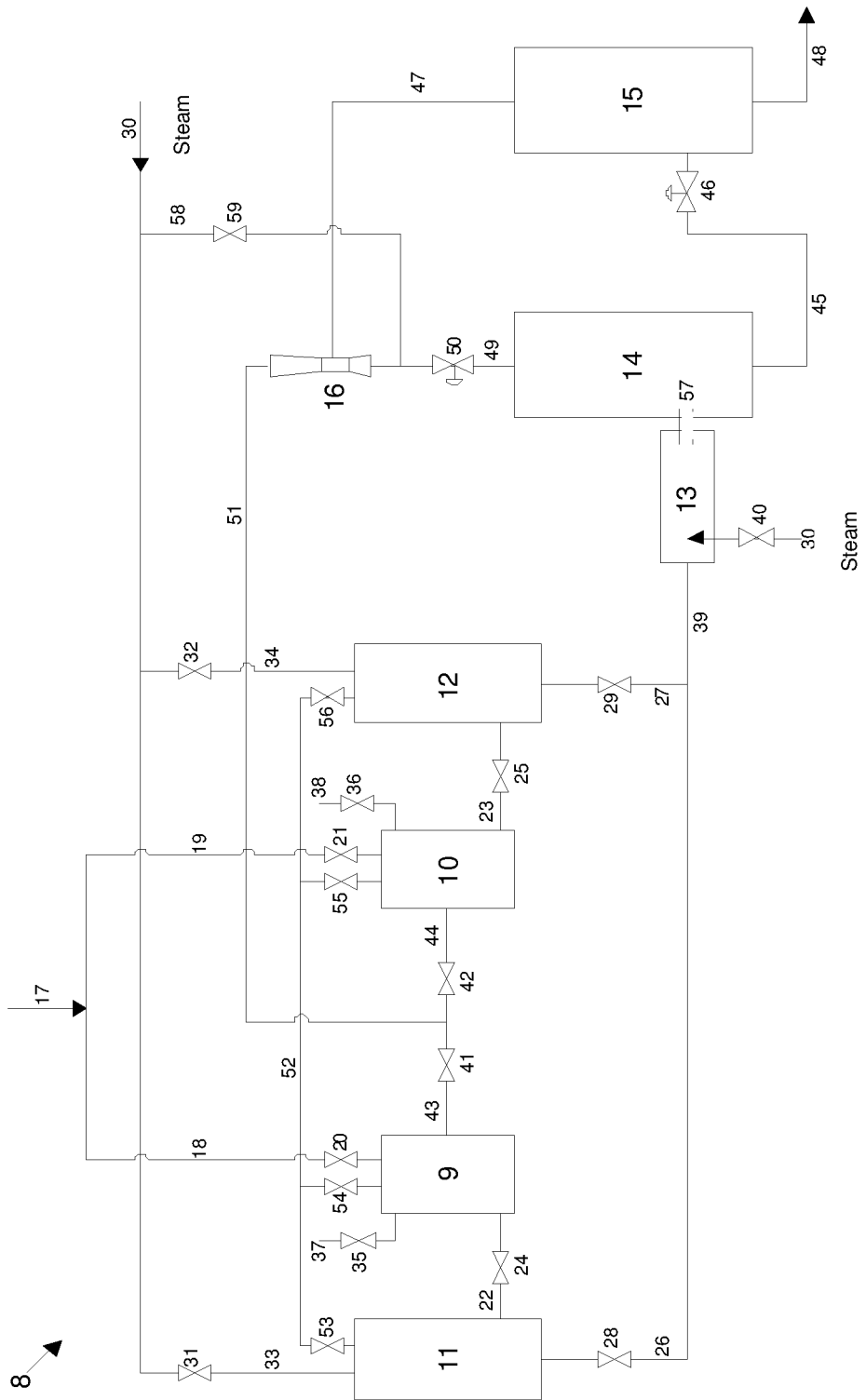
FIG. 3 represents a schematic of the installation to apply the procedure according to a variation of the invention.

Illustrated by FIG. 3, the description of the procedure of the claimed invention and the facility used to build an installation (8) follows.

The installation facility is: dosification vessels (9, 10), pressurization vessels (11, 12), injection and quick steam mixing system (13), regulation tank (14), flash vessel (15), ejector or thermocompressor (16).

The material to be hydrolyzed (17), previously concentrated, is conveyed via pipework, conveyor belt or any other mechanical means (18, 19) to the dosification system (9, 10), where in pre-determined times and via pipework (22, 23) it is conveyed to the pressurization vessels (11, 12). The dosification and pressurization vessels are interconnected via a pipe rack (52) and the corresponding shutoff valves (53, 54, 55, 56). The dosification vessels have vents (37, 38) to purge the non-condensables through valves (35, 36). Valves (41, 42) allow directing the vapor flow (51) from the ejector (16) to the desired dosification vessel, where via condensation the temperature increases.

The pressurization vessels are connected to the high-pressure steam or compressed air line through pipework (33, 34) and the flow is determined through valves (31, 32); the hot, pressurized material enter the hydrolysis stage via pipework (26, 27) and associated valves (28, 29).

Adjusting the time cycles and the valves opening and closing, the dosification vessels (9, 10) play the two-fold role of recovering process vapors and allowing the flow of the material to be hydrolyzed to the pressurization vessels.

Such pressurization system comprises two vessels (11, 12) that also operate in batch, consecutive cycles. In the first part of a typical cycle, the loaded, pressurized vessel (12) discharges via pipework (27) and valve (29) so that a continuous, controlled rate of material to be hydrolyzed flows to the heating stage (13). Meanwhile, vessel (11) that has completed its discharge cycle is first depressurized, then receives a new batch of feed from vessel (9) and, after being pressurized and via opening of valve (28), is ready to start feeding the heating stage once valve (29) is shut and vessel (12) has reached minimum level.

All the pipework, valves and vessels are made of steel and are designed to withstand pressures of up to 30 barg.

This method and operating procedure allow continuously moving fluids at high pressure without the need for pumps or any other mechanical means. A full cycle, combination of the two semi-cycles described, can last between 5 and 30 minutes.

With a standard regulation and control system, not included in the figure, and via pipework (39), the material enters the heating system (13) where through steam injection (30) regulated by valve (40), the pre-determined operating temperature is quickly achieved. The special design of the liquid-steam mixing system (13) allows operating with periods shorter than 5 seconds.

As a function of the short mixing time and in order to achieve a finer pressure control, a regulation or relief vessel (14) is used, that operates at a lower pressure than the mixer (13) and where the residence time of the organic material can be regulated, and that as a consequence of the decompression between the mixer (13) and the relief tank (14) has suffered a first fracture of its physical structure; via pipework (45) the hot, pressurized material in the relief tank (14) flows to the depressurization system. Due to the pressure difference between the mixer (13) and the relief vessel (14), part of the hydrolyzed material vaporizes and the vapor stream (49) enters the ejector (16).

Figure 1:
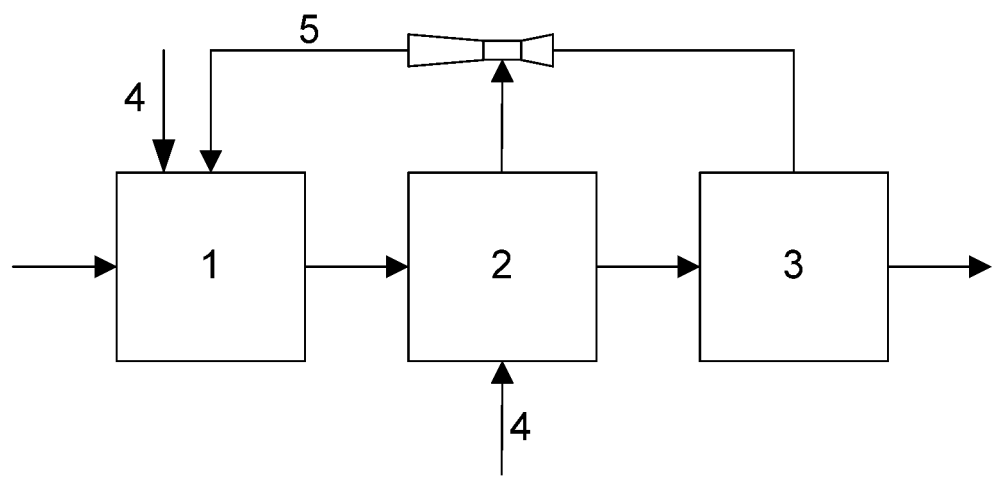
FIG. 1 represents a block diagram of the operation. (1) Loading and impulsion section, (2) Hydrolysis section, (3) Energy recovery section, (4) Heating and pressurization steam, (5) Recovered vapors.
Figure 2:
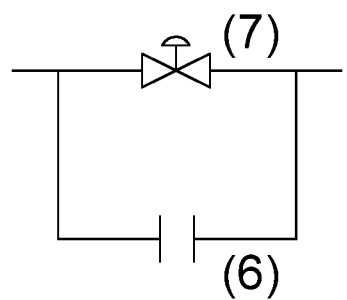
FIG. 2 represents a diagram of the decompression system connecting the relief tank in the hydrolysis section and the phase separation chamber or flash tank, pre-dimensioned orifice (6) and automatic regulation valve (7).

The depressurisation system (46) is described in FIG. 2 and comprises two parallel pipes, with the first parallel pipe having a pre-dimensioned orifice (6) that takes between 60 and 90% of the total flowrate of the pressurised material and the second parallel pipe having an automatic regulation valve (7) that takes the remaining flowrate, allowing an accurate and pulse-free regulation.

After the decompression system (46), the depressurised material enters the flash vessel (15), where the pressure is controlled between −0.5 and 4 barg. In there, and due to the sudden pressure change, flash occurs and the material stream is split into an hydrolyzed liquid (48) that leaves the process and feeds the downstream anaerobic digestion (not shown in the sketch) and a vapor (47) whose energy is recovered by sending it to an ejector (16) where it is mixed with vapor from the relief tank (49) and finally enters the dosification vessels (9, 10), via valves (41, 42).

EXAMPLE OF AN EMBODIMENT OF THE INVENTION

A description follows for an installation treating all the sludge generated in a municipal wastewater treatment plant. The flowrate to be treated is equivalent to 3000 kg/h of sludge, previously concentrated in a centrifuge, press filter or any other mechanical means to achieve a concentration between 10 and 20% total solids. The hydrolyzed sludge is sent, outside the battery limits of this invention, to a mesophilic anaerobic digester that operates at 35° C. To meet the energy integration requirements of this example, the average outlet temperature of the hydrolyzed sludge is approximately 130° C.

The typical cycle of the impulsion stage of the material to be hydrolyzed includes loading, heat recovery, pressurization and circulation of the material that continuously feeds the hydrolysis stage. A standard 20-minute cycle is divided into two 10-minute semi-cycles, allowing to carry out six semi-cycles per hour, so that the material fed to the dosification vessels (9, 10) is 500 kg per load, resulting in dosification vessels (9, 10) volumes and pressurization vessels (11, 12) volumes below 1 m$^3$.

The concentrated material is sequentially loaded in the dosification vessels (9, 10) via pipework or conveyor belt (18, 19) equipped with shutoff valves (20, 21) to isolate the vessels (9, 10) as necessary.

The dosification vessels (9, 10) are connected to the pressurisation vessels (11, 12) through pipework (22, 23) equipped with the corresponding shutoff valves (24, 25). Those pressurisation vessels (11, 12) include steam inlets (33, 34) with the corresponding shutoff valves (31, 32), that allow the sequential pressurization of the vessels.

At the beginning of a cycle, time zero, the vessels are: (9) loaded and partially hot, (10) loaded and cold, (11) empty and pressurized, (12) loaded, hot and pressurized.

At the beginning of the cycle, valve (28) shuts and valve (29) opens simultaneously, so that the flow from pressurization vessel (11) is interrupted and the preheated, pressurized material from vessel (12) starts flowing, constituting the continuous feed to the hydrolysis process for the next 10 minutes.

In this semi-cycle, dosification vessel (10) that initially contained the sludge at ambient temperature, receives vapors from the ejector (16) and, once the semi-cycle is finished, that vessel will be loaded with preheated sludge at 160° C.

Simultaneously, and during this first semi-cycle, dosification vessel (9) that initially contained sludge to be hydrolised at high temperature due to the vapors condensation, is pressurized to 6 barg. One minute later, and opening valve (24), the preheated material flows to vessel (11) that had been previously depressurized towards the dosfication vessel (10) via valves (53, 55). This flows during 3 minutes. Once (9) is empty, it is depressurized by connecting it to dosification vessel (10) and venting via valve (36) so that residual vapors and non-condensables are purged via pipework (37) to a recovery and odor elimination stage (not included in the figure). After depressurization vessel (9) receives a new 500 kg load of sludge, so at the end of the 10 minutes of the semi-cycle, it is loaded with sludge at ambient temperature.

Pressurisation vessel (11) that at the beginning of the cycle is empty and pressurised, is depressurised for 1 minute; after that time valve (24) opens to allow the flow of material to be hydrolyzed from vessel (9). Finally, the system is pressurized with live steam (30) controlled by valve (31), and at the end of the semi-cycle vessel (11) is loaded with hot sludge, pressurized and ready to feed the thermal hydrolysis system (13, 14).

With this sequence, the final condition of the vessels is: (9) loaded and cold, (10) loaded and hot, (11) loaded, hot and pressurized, (12) empty and pressurized.

In the new semi-cycle that starts after 10 minutes, pressurisation vessel (11) continuously feeds the thermal hydrolysis system, while (12) undergoes a depressurisation, loading and pressurisation process. Something similar happens to the dosification vessels: while in this new semi-cycle (9) receives vapor to preheat the material, (10) undergoes a pressurisation, emptying, depressurisation and loading process.

Once the second semi-cycle is completed, i.e. after 20 minutes, a new cycle starts with the same features as described.

The pressure in the pressurisation vessels, between 4 and 25 barg, creates a continuous flow of material to be hydrolyzed, that reaches the hydrolysis system via pipework (39) at temperatures between 60 and 140° C. The control system is standard and it is not subject of the invention.

The material from the pressurization vessels (11, 12) enters the quick mixer (13) where live high-pressure steam is injected at 10-25 barg (30), controlled by valve (40). The quick mixing system allows the sludge to achieve, in less than 5 seconds, high temperatures of up to 220° C., higher than the ones used by other commercial technologies. Given the short times at the high temperature, the organic material does not degrade and does not produce inhibitors or substances that are not biodegradable under anaerobic conditions.

For an adequate process control and to maintain the desired temperature, the hot sludge flows to a regulation or relief tank (14) via orifice (57) and it is kept in that chamber between 1 and 15 minutes, at temperatures between 140 and 180° C. Due to the pressure difference, of up to 20 barg in the quick mixer (13) and of up to 10 barg in the relief tank (14), the sludge going through orifice (57) experiments a first fracture of its structure. Due to the lower pressure in the relief tank (14), vapor is produced with pressure of up to 10 barg that enters ejector (16) via pipework (49) and controlled by valve (50).

To recover energy from the hydrolyzed sludge that exits via pipework (45) at 8 barg and 170° C., it is decompressed in system (46), which corresponds to FIG. 2. Because of the decompression, flash occurs and flash vessel (15) splits the total flow creating vapor stream (47) that goes to the ejector (16) to be mixed with the medium-pressure steam (49) and flows (51) to the impulsion system. When the temperature in vessel (10) reaches 140° C., live steam is introduced in the thermocompressor to regulate the flow so that at the end of the semi-cycle the temperature is 165° C.

The hydrolyzed sludge stream (48) at 130° C. flows to anaerobic digestion (not included in the sketch).

This operation achieves an energy integration that is superior to that of other technologies, because of the total condensation of the medium and low-pressure process vapors, a better sludge hydrolysis with biogas yields increasing by more than 30%, a robust, compact and easy to standardize system and the additional advantage of not needing pumps that operate at high pressures and temperatures with viscous and abrasive materials, avoiding the resulting maintenance problems. Working with short cycles and short hydrolysis stage residence times, the equipment is significantly smaller than other technologies and the operating flexibility allows an optimal integration for any application.

The invention claimed is:

1. A system for the thermal hydrolysis of organic material that operates in a continuous state, comprising impulsion, hydrolysis and energy recovery stages, comprising:
    an impulsion stage comprising a first and a second dosification vessel, each dosification vessel comprising organic material to be hydrolyzed; and a first and a second pressurization vessel, wherein each of the first and second pressurization vessels receive a load of organic material to be hydrolyzed from one of the first or the second dosification vessels, wherein the first and second pressurization vessels are heated using steam to heat the organic material to a temperature of between about 60 and 140° C., wherein thereafter the first and second pressurization vessels are pressurized to pressures between 4 and 25 barg using steam, compressed air or a combination of steam and compressed air;
    a hydrolysis stage comprising a heating system and a regulation vessel, wherein the organic material is mixed in the heating system with steam to heat the organic material to about 220° C. in about 5 seconds, wherein the heated organic material thereafter is fractured when it flows through an orifice to a regulation tank due to the pressure difference between the heating system and the regulation vessel, where the fractured organic material is maintained in the regulation vessel at a temperature between about 140 and 180° C. for a period of time between 1 and 15 minutes such that the fractured organic material is hydrolyzed by temperature process; and
    an energy recovery stage comprising a decompression system and a flash vessel, wherein the hydrolyzed organic material decompresses as it passes through the decompression system, wherein the decompressed organic material flows to the flash vessel that operates at pressures between about −0.5 and 4 barg, wherein the decompressed organic material is split due to flashing into a hydrolyzed liquid and a vapor;
    wherein vapor generated in the regulation vessel of the hydrolysis stage having a first enthalpy and vapor produced in the flash vessel having a second enthalpy are directed to an ejector or thermocompressor that conveys the mixed vapors to the first or second dosification vessels in the impulsion stage, wherein the vapors condense, preheating organic material that is loaded in the first and second dosification vessels, wherein the first enthalpy is different from the second enthalpy.

2. The system according to claim 1, wherein the hydrolyzed liquid leaving the flash vessel tank enters an anaerobic digestion system.

3. The system according to claim 1, wherein through the opening and closing of valves, the first and second dosification vessel and the first and second pressurization vessels operate in cycles, resulting in a constant and controlled flow of organic material to be hydrolyzed at high pressure.

4. The system according to claim 3 wherein the cycles last from around 10 minutes to 60 minutes.

5. The system according to claim 1 wherein the time of mixing of the organic material in the heating system is of an amount of time that does not permit the occurrence of secondary reactions leading to the formation of inhibitors or non-biodegradable substances.

6. The system of claim 1, wherein the pressurization of the first and second dosification vessels and the first and second pressurization vessels cause the flow of organic material through the system in the absence of pumps.

7. The system of claim 1 wherein the decompression system comprises two parallel pipes, a first parallel pipe comprising a fixed diameter orifice and the second parallel pipe comprising an automatic control valve.

8. A method of thermal hydrolysis of organic material, comprising:
    loading organic material to be hydrolyzed into a first dosification vessel and a second dosification vessel;

heating and pressurizing the first and second dosification vessels;

thereafter allowing the heated organic material to flow into a first pressurization vessel and a second pressurization vessel, heating the organic material in the first and second pressurization vessels with steam to a temperature of about 60 to 140° C., and thereafter pressurizing the first and second pressurization vessels with steam, compressed air or a combination of steam and compressed air to a pressure of about 4 and 25 barg;

thereafter allowing the pressurized organic material to flow into a heating system whereupon the organic material is heated to a temperature of about 220° C. in about 5 seconds;

thereafter transiting the organic material from the heating system to a regulation vessel, wherein the organic material is fractured due to the pressure difference between the heating system and the regulation vessel;

thereafter maintaining the fractured organic material in the regulation vessel at a temperature of about 140 to 180° C. for between 1 and 15 minutes such that the fractured organic material is hydrolyzed;

thereafter passing the hydrolyzed organic material through a decompression system;

thereafter allowing the hydrolyzed organic material to enter into a flash vessel that operates at pressures between −0.5 and 4 barg, wherein the hydrolyzed organic material is split due to flashing into a hydrolyzed liquid and a vapor; and thereafter directing vapor produced in the flash vessel having a first enthalpy and vapor produced in the regulation vessel having a second enthalpy to the first and second dosification vessels, wherein the first enthalpy is different from the second enthalpy.

9. The method of claim 8, further comprising directing the hydrolyzed liquid to an anaerobic digestion system or any other processing system.

10. The method of claim 8 wherein the first and second dosification vessels and the first and second pressurization vessels operate in cycles, resulting in a constant and controlled flow of organic material to be hydrolyzed.

11. The method according to claim 10 wherein the cycles last from around 10 minutes to 60 minutes.

12. The method according to claim 8 wherein the time of mixing of the organic material in the heating system is of an amount of time that does not permit the occurrence of secondary reactions leading to the formation of inhibitors or non-biodegradable substances.

13. The method of claim 8, wherein the pressurization of the first and second dosification vessels and the first and second pressurization vessels causes the flow of organic material in the absence of pumps or any other mechanical devices.

14. The method of claim 8, further comprising introducing steam into the first and second dosification vessels to heat the loaded organic material to be hydrolyzed.

\* \* \* \* \*